UNITED STATES PATENT OFFICE.

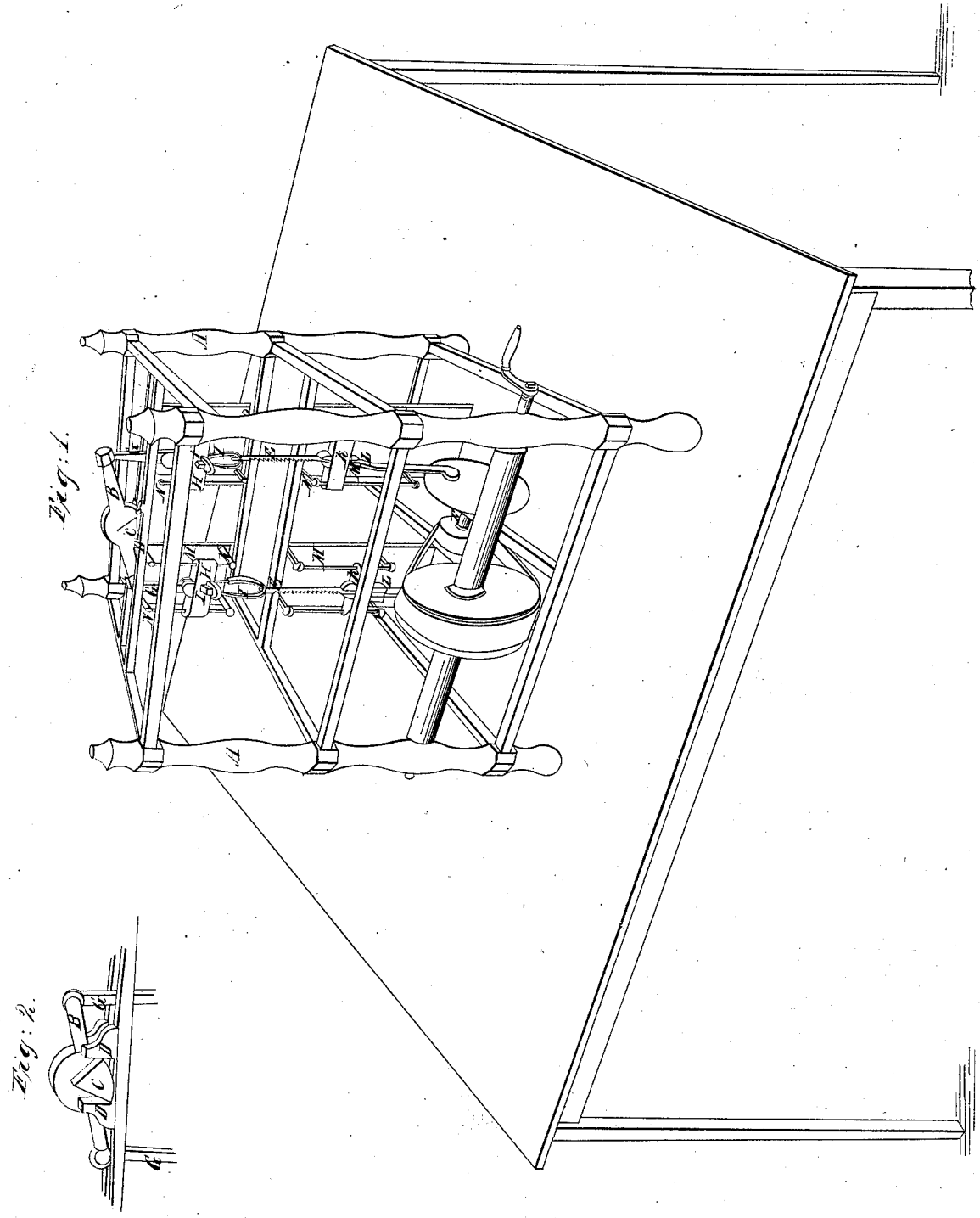

JNO. C. YATES, OF COLUMBIA, TENNESSEE.

SAWMILL WITHOUT SAW-GATE.

Specification of Letters Patent No. 700, dated April 21, 1838.

*To all whom it may concern:*

Be it known that I, JOHN C. YATES, of Columbia, in the county of Maury and State of Tennessee, have invented a new and useful Improvement in the Construction of Sawmills, called "Yates' Gateless Sawmill," which is described as follows, reference being had to the annexed drawings of the same, making part of this specification.

The frame A, Figure 1, may be made of any convenient form, size, and strength for the purpose intended. A vibrating beam B, Figs. 1 and 2, is placed at the top of the frame. Its fulcrum C, is triangular or polygonal, instead of round. It moves in rectangular boxes D, instead of curved. The sides of the fulcrum moving on the bottoms of the boxes may be made convex to prevent jarring, as the beam vibrates. To each end of the vibrating beam is attached a straight saw E, E, in the following manner, whose lower ends are attached to a crank shaft F, below. As the saws T heads, rods, &c., at both ends of the vibrating beam are the same, only those at one end need be described. Then, to the end of the beam is attached in the usual manner by a joint a connecting rod G: to the lower end of this connecting rod a T head H: to the T head a harp-iron I with nuts J to raise or lower it: to the harp iron the upper end of the saw E, the lower end of said saw being attached to another harp iron, or it may be attached immediately to a lower T head K, the last mentioned T head K being connected with the crank shaft by a pitman rod L.

The saw E is made to work vertically by means of rods M passing through the T heads over which rods they work loosely, said rods being sustained in a vertical position by arms N projecting horizontally from the main frame or in any convenient manner.

The nuts J on the ends of the harp iron are for straining the saws when they require it.

The other connecting rod, upper T head, harp iron, saw, lower T head, pitman, rod, &c., attached to the other end of the vibrating beam being made similar to those just described need not, therefore, be more particularly described.

The crank shaft may be turned by pulleys and bands; or cog wheels, by steam; or by water by means of a flutter wheel, or otherwise, applying the power directly to the crank shaft, or by the power of steam applied directly to the crank shaft.

There may be more than two saws, and the saws may be arranged in gangs, or otherwise.

The operation of the machine is as follows: The crank shaft F being put in motion, one of the cranks will be up while the other is down, the pitman rod, saw, and connecting rod on one side draws down one end of the beam, at the same time raising the other end with the opposite saw, the beam vibrating on the triangular fulcrum. When one end of the beam is down it of course will rest on the corners of the fulcrum nearest said depressed end of the beam, at the same time changing the center by raising it from the box and increasing the length of the other end of the beam, thus keeping the saws always strained to a proper degree of tension and so vice versa.

The object of having the fulcrum made in this shape is not only to change the center of vibration alternately by which the arms of the beam are alternately lengthened—thus compensating for a loss experienced at every half revolution of the crank shaft by the extension of the pitman rods but also to prevent the saws or works being broken— for when the cranks are horizontal the pitman rods form the hypothenuses of two triangles, which of course will produce longer lines than the perpendiculars or the lines extending from the center of the joint or connection with the lower J head to the center of the crank shaft, and consequently produces a strain or drawing down at each end of the beam, simultaneously: and the plummer boxes being immovable and the center of the cylindrical fulcrum as of a steam engine for instance remaining unchanged. Of course the saws must either be broken or stretched, or some part of the connection be lengthened or injured. But the fulcrum being made of a triangular, or polygonal shape, with the lower side or that which moves over the bottom of the box flat, or nearly so, the center of the vibrating beam is made to descend or approach nearer to the crank shaft at the moment the pitman rods are extended when the beam and cranks are horizontal and thus the strain, before mentioned, is prevented. This constitutes the main feature of my invention.

The timber to be sawed is secured upon a carriage and brought to the saws and receded from them in any of the most improved modes in use, known to mechanics; but as no claim is made to this part of the machine a particular description is not deemed necessary.

What the subscriber claims as his invention and which he desires to secure by Letters Patent consists—

In the form of the fulcrum of the vibrating beam in combination with the rectangular boxes in which it moves.

JOHN C. YATES.

Witnesses:
W<small>M</small>. P. E<small>LLIOT</small>,
W. B<small>ISHOP</small>.